Feb. 11, 1941.  F. C. DOMINA, JR  2,231,858
ENGINE THROTTLE CONTROL
Filed Feb. 24, 1940  2 Sheets-Sheet 1

Inventor
FREDERICK C. DOMINA, JR.
By
Attorney

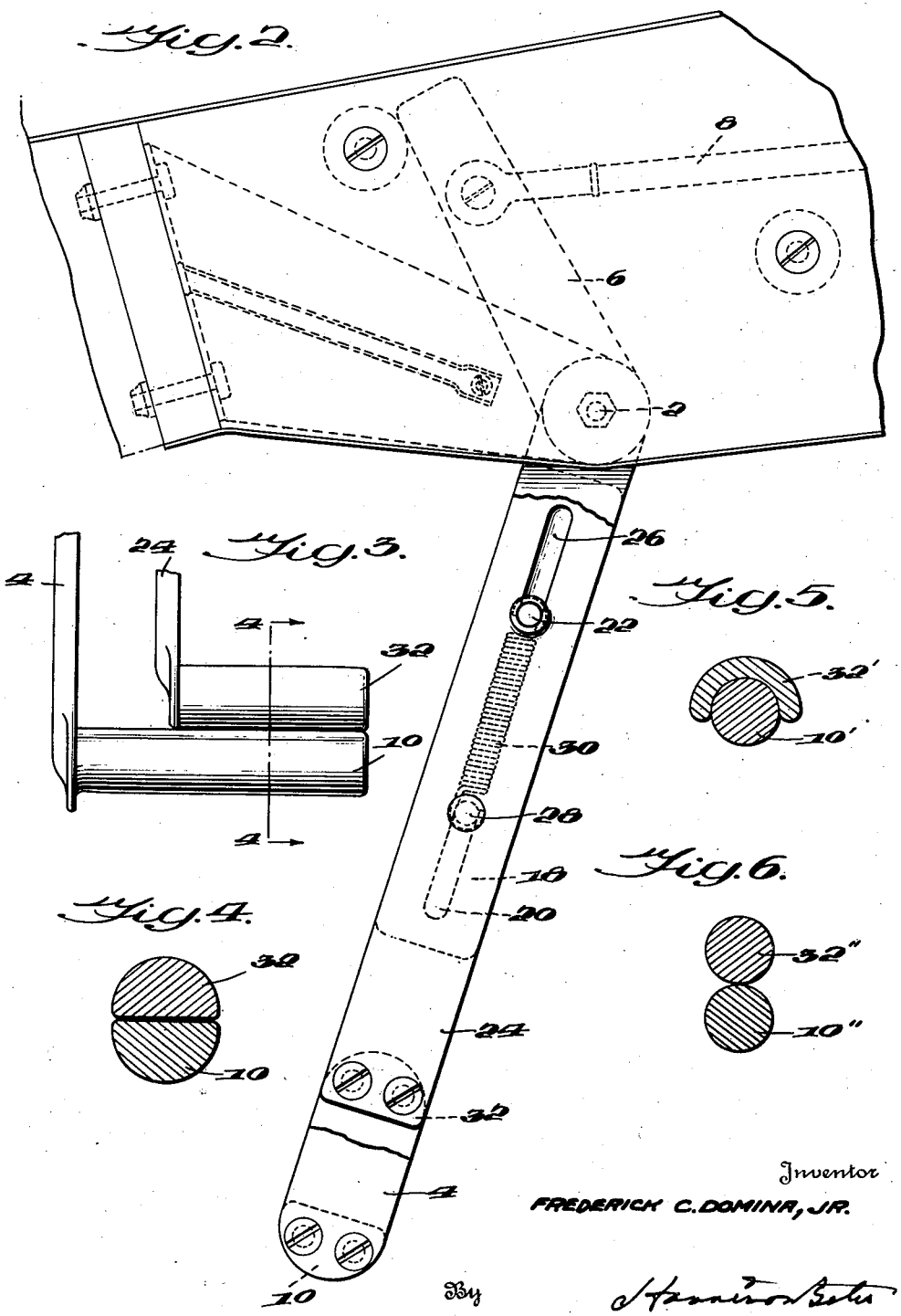

Patented Feb. 11, 1941

2,231,858

UNITED STATES PATENT OFFICE 2,231,858

ENGINE THROTTLE CONTROL

Frederick C. Domina, Jr., Baltimore, Md., assignor to The Glenn L. Martin Company, Baltimore, Md.

Application February 24, 1940, Serial No. 320,540

12 Claims. (Cl. 74—491)

The invention relates to lever systems, and particularly to a system of levers for the individual or joint control of a plurality of engines in aircraft.

In multi-engined aircraft, the control of the different engines by the pilot or operator presents difficult problems, since it is often desirable to control the engines individually, while at other times the simultaneous control of a plurality of engines is necessary.

The primary object of the present invention is to provide a simple and convenient arrangement for the control of a plurality of engines.

A further object is to arrange and construct the individual levers for the different engines in such a way that it is easy for the pilot to regulate the engines either individually or jointly in any desired manner.

Still another object of the invention, particularly for aircraft having at least four engines, two on each side, is to make it possible for the pilot with one hand only to control any single engine, or both engines on one side of the aircraft, or two engines on opposite sides, or all the engines, in a simple manner in which no great danger of confusion and thus of improper maneuvering of the aircraft arises.

The invention contemplates the arrangement of two control levers in such positions and of such construction that the handles of the two levers may be easily grasped and drawn together for manipulation by the pilot with one hand, while these handles are normally maintained separate to facilitate manipulation of the levers individually.

Further objects and advantages of the invention will appear more fully from the following description, particularly when taken in conjunction with the accompanying drawings which form a part thereof.

In the drawings:

Fig. 2 is a side elevation thereof;

Fig. 3 is a view of a portion of the mechanism showing two of the lever handles in a different position;

Fig. 4 is a cross section on the line 4—4 of Fig. 3;

Figs. 5 and 6 are cross sections similar to Fig. 4, showing modifications of the invention.

Figure 1:
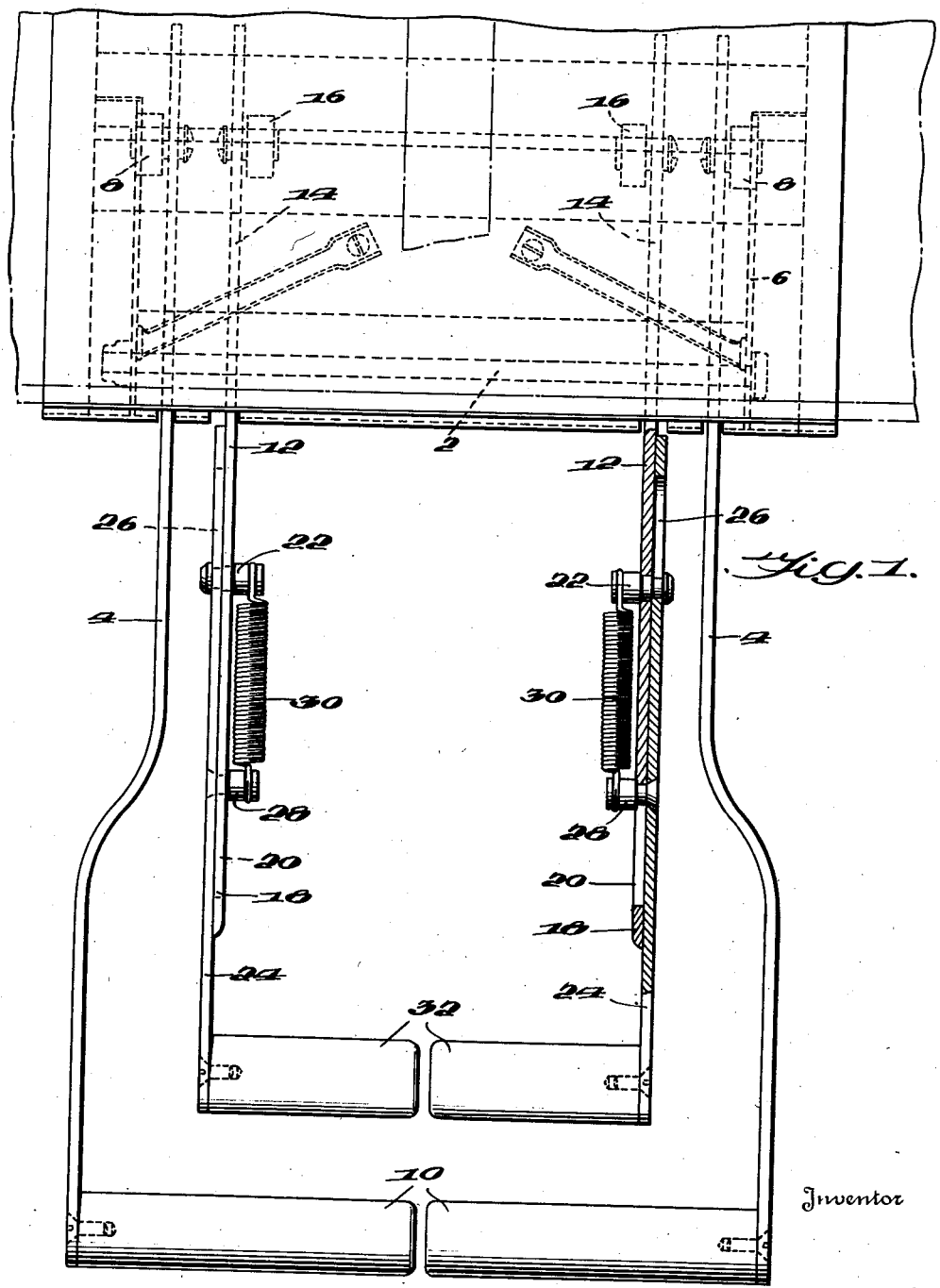
Fig. 1 is a front elevation of a lever system embodying my invention, showing the parts in normal position.

The invention is shown as applied to four control levers, intended for example for the control of four engines for driving an aircraft. Each control lever is pivoted on an axis 2. The control levers are arranged in side-by-side relation as shown in Fig. 1. The outer levers 4, connected for example to the outer motors of the aircraft, are simple levers each having an arm 6 extending therefrom on the opposite side of the pivot 2 and connected by a rod 8 to the engine, this rod thus constituting the controlling member for the engine. Each of the levers is also provided with a handle 10, these handles being directed inwardly towards each other and having their free ends closely adjacent each other.

The two inner levers 12 are each likewise provided with a projection 14 on the opposite side of the lever to which is pivoted an engine controlling member composed of a rod 16. The downwardly or outwardly extending portion 18 of each lever 12 has therein a slot 20 and a pin 22. A second lever portion 24 is provided with a slot 26 which engages pin 22 and a pin 28 which engages in slot 20. The two lever parts are thus slidable longitudinally with respect to each other, while being maintained in aligned relation at all times.

Pins 22 and 28 are connected by a coil tension spring 30, which normally holds the parts in the position shown in Figs. 1 and 2, which is the retracted position.

On the free end of each of the lever portions 24 are inwardly extending handle portions 32, which extend towards each other and are slightly spaced apart at their inner ends.

The purpose and operation of this construction is as follows:

If one or both of the outer engines is to be operated, the handles 10 are grasped and levers 4 are moved by the operator either individually or together. If one or both of the inner engines is to be operated, handles 32 are grasped and levers 12 are operated either individually or together.

If, on the other hand, the operator wishes to control simultaneously the two engines on one side of the aircraft, then he engages with his hand one of the handles 10 and the handle 32 on the same side, and draws these handles together to the position shown in Figs. 3 and 4, the handle 32 being permitted to move by the spring 30. The handles are then easily moved as a single unit, so that the motors can be controlled. If all four motors are to be controlled simultaneously, then both handles 32 are drawn up to the handles 10, which can be done with one hand, and the operator may then by a single movement of that hand either advance or retard all four of the engines simultaneously.

Fig. 4 shows the preferred cross section of the handles 10 and 32, each being substantially semicircular. This cross section is not necessary. Figs. 5 and 6 show other possible cross-sections, indicated at 10', 32', and 10", 32" respectively.

While I have described herein some embodiments of my invention I wish it to be understood that I do not intend to limit myself thereby except within the scope of the appended claims.

I claim:

1. In combination, a plurality of control members, handles for said control members, means mounting at least one of said handles on one control member for movement towards and from another handle on another control member, and means normally urging said handles apart.

2. In combination, a plurality of levers mounted to turn, said levers having handles, and means mounting one of said handles on its lever for movement between a position adjacent to the handle of the other lever and a position spaced therefrom, whereby in said first position said levers may easily be manipulated together while in said second position they may be manipulated separately.

3. In combination, a plurality of levers mounted to turn, said levers having handles, and means mounting one of said handles on its lever for movement towards and from the lever axis between a position adjacent to the handle of the other lever and a position spaced therefrom, whereby in said first position said levers may easily be manipulated together while in said second position they may be manipulated separately.

4. In combination, a plurality of levers mounted to turn about a common axis, said levers having handles, and means mounting one of said handles on its lever for movement towards and from the lever axis between a position adjacent to the handle of the other lever and a position spaced therefrom, whereby in said first position said levers may easily be manipulated together while in said second position they may be manipulated separately.

5. In combination, a plurality of levers mounted to turn, said levers having handles, means mounting one of said handles on its lever for movement between a position adjacent to the handle of the other lever and a position spaced therefrom, whereby in said first position said levers may easily be manipulated together while in said second position they may be manipulated separately, and means urging said movable handle to said second position.

6. In combination, a plurality of levers mounted to turn about a common axis, said levers having handles, means mounting one of said handles on its lever for movement towards and from the lever axis between a position adjacent to the handle of the other lever and a position spaced therefrom, whereby in said first position said levers may easily be manipulated together while in said second position they may be manipulated separately, and means urging said movable handle to said second position.

7. In combination, two levers mounted to turn about a common axis, control members connected to said levers, the levers having at their ends handles parallel to said axis, one of the levers comprising inner and outer portions, means mounting said outer portion to slide with respect to the inner portion, whereby one of said handles is movable between a position spaced from said other handle and a position closely adjacent said other handle.

8. In combination, two levers mounted to turn about a common axis, control members connected to said levers, the levers having at their ends handles parallel to said axis, one of the levers comprising inner and outer portions each having a longitudinal slot therein and a pin engaging in the slot in the other portion, whereby said portions may slide with respect to one another, whereby one of said handles is movable between a position spaced from said other handle and a position closely adjacent said other handle.

9. In combination, two levers mounted to turn about a common axis, control members connected to said levers, the levers having at their ends handles parallel to said axis, one of the levers comprising inner and outer portions each having a longitudinal slot therein and a pin engaging in the slot in the other portion, whereby said portions may slide with respect to one another, a spring connected to said pins and normally urging said outer portion toward the lever axis, whereby one of said handles is movable between a position spaced from said other handle and a position closely adjacent said other handle.

10. In combination, four levers mounted to turn about a common axis, control members connected to said levers, the outer pair of levers having at their ends handles parallel to said axis directed towards each other and terminating closely adjacent each other, the inner pair of levers each comprising inner and outer portions, means mounting said portions to slide with respect to one another, spring means normally urging said outer portions toward the lever axis, and handles on the outer ends of said outer portions parallel to said axis directed towards each other and terminating closely adjacent each other, said second handles being normally spaced from said first handles and being movable against the action of said spring means to positions closely adjacent said first handles.

11. In combination, four levers mounted to turn about a common axis, control members connected to said levers, the outer pair of levers having at their ends handles parallel to said axis directed towards each other and terminating closely adjacent each other, the inner pair of levers each comprising inner and outer portions, each of said portions having a longitudinal slot therein and a pin engaging in the slot in the other portion, whereby said portions may slide with respect to one another, springs connected to said pins and normally urging said outer portions toward the lever axis, and handles on the outer ends of said outer portions parallel to said axis directed towards each other and terminating closely adjacent each other, said second handles being normally spaced from said first handles and being movable against the action of said spring to positions closely adjacent said first handles.

12. In combination, a plurality of independently movable control members, handles for said control members, means mounting at least one of said handles of one control member on said control member for movement with respect thereto without operation of the control member towards and from another handle on another control member, and means normally urging said handles apart.

FREDERICK C. DOMINA, JR.